United States Patent
Shida

(10) Patent No.: US 10,690,568 B2
(45) Date of Patent: Jun. 23, 2020

(54) OPTICAL FIBER TEMPERATURE DISTRIBUTION MEASUREMENT SYSTEM AND OPTICAL FIBER TEMPERATURE DISTRIBUTION MEASUREMENT METHOD

(71) Applicant: Yokogawa Electric Corporation, Musashino-shi, Tokyo (JP)

(72) Inventor: Hideo Shida, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 553 days.

(21) Appl. No.: 15/441,445

(22) Filed: Feb. 24, 2017

(65) Prior Publication Data
US 2017/0248495 A1    Aug. 31, 2017

(30) Foreign Application Priority Data

Feb. 25, 2016  (JP) ................. 2016-034472

(51) Int. Cl.
*G01M 99/00* (2011.01)
*G01K 13/08* (2006.01)
(Continued)

(52) U.S. Cl.
CPC .......... *G01M 99/002* (2013.01); *B65G 15/00* (2013.01); *B65G 43/00* (2013.01); *G01K 11/32* (2013.01);
(Continued)

(58) Field of Classification Search
CPC .... G01M 99/002; G01M 13/00; G01K 13/08; G01K 11/32; G01K 2011/324; B65G 15/00; B65G 43/00; B65G 2203/044
See application file for complete search history.

(56) References Cited

U.S. PATENT DOCUMENTS 5,028,146 A * 7/1991 Wada ..................... G01K 1/026
374/129

FOREIGN PATENT DOCUMENTS

| CN | 203283811 U | 11/2013 |
|---|---|---|
| JP | 7296274 A | 11/1995 |

(Continued)

OTHER PUBLICATIONS

Extended European Research Report dated Jul. 4, 2017, by the European Patent Office in counterpart European Application No. 17157765.3.

*Primary Examiner* — Alexander Satanovsky
*Assistant Examiner* — Mark I Crohn
(74) *Attorney, Agent, or Firm* — Sughrue Mion, PLLC

(57) ABSTRACT

An optical fiber temperature distribution measurement system includes a temperature difference calculator configured to calculate a temperature difference between corresponding spatial resolution zones based on a first temperature distribution obtained by a return light from a first optical fiber part and a second temperature distribution obtained by a return light from a second optical fiber part, and an abnormality detector configured to calculate a temperature difference for evaluation for each spatial resolution zone, the temperature difference for evaluation being a sum of a temperature difference of each spatial resolution zone and a temperature difference of a spatial resolution zone adjacent thereto, and to determine that an abnormality has occurred in a roller near the spatial resolution zone when the calculated temperature difference for evaluation exceeds a reference value.

11 Claims, 6 Drawing Sheets

(51) Int. Cl.
*B65G 15/00* (2006.01)
*B65G 43/00* (2006.01)
*G01K 11/32* (2006.01)
*G01M 13/00* (2019.01)

(52) U.S. Cl.
CPC ............ *G01K 13/08* (2013.01); *G01M 13/00* (2013.01); *B65G 2203/044* (2013.01); *G01K 2011/324* (2013.01)

(56) References Cited

FOREIGN PATENT DOCUMENTS

JP           8268533 A      10/1996
JP        2014-083297 A      5/2014

\* cited by examiner

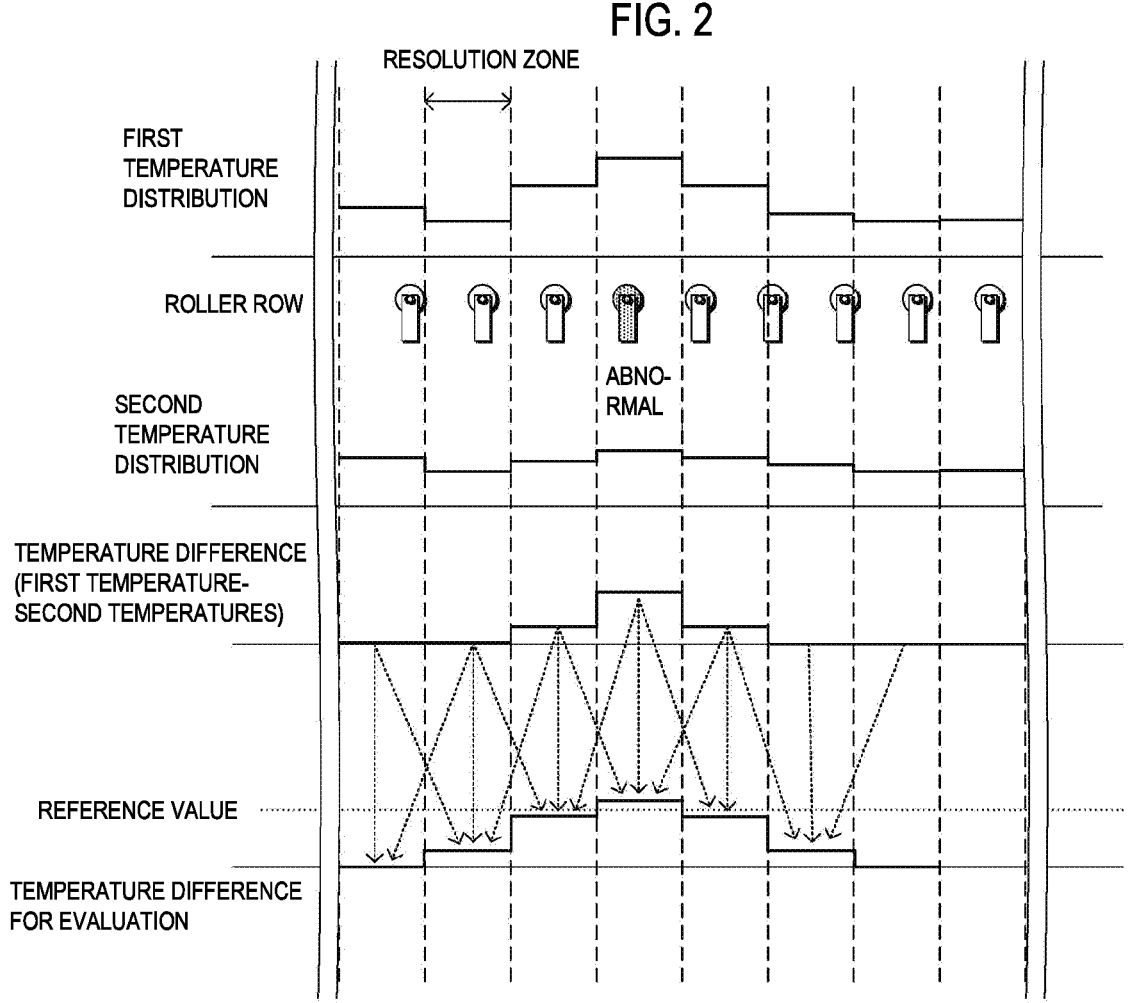

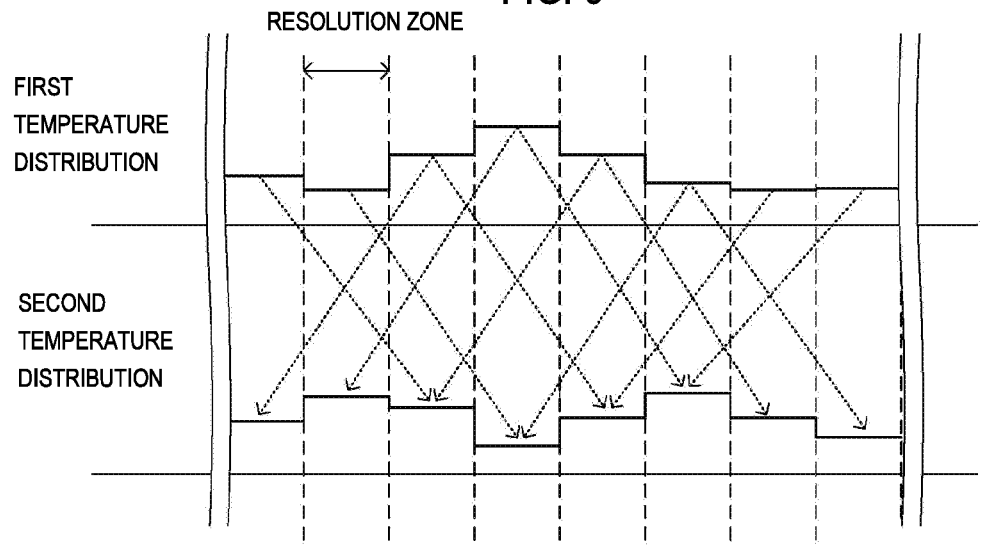

OPTICAL FIBER TEMPERATURE DISTRIBUTION MEASUREMENT SYSTEM AND OPTICAL FIBER TEMPERATURE DISTRIBUTION MEASUREMENT METHOD

CROSS-REFERENCE TO RELATED APPLICATION

The present application claims priority from Japanese Patent Application No. 2016-034472 filed on Feb. 25, 2016, the entire content of which is incorporated herein by reference.

BACKGROUND

Technical Field

The invention relates to an optical fiber temperature distribution measurement system and an optical fiber temperature distribution measurement method for detecting a roller abnormality of a belt conveyor.

Related Art

A system configured to measure temperatures near a belt conveyor by using an optical fiber temperature distribution measurement device (DTS: Distributed Temperature Sensor) and to detect a fire of the belt conveyor has been known.

The configuration of measuring temperatures near the belt conveyor and detecting a fire of the belt conveyor is very beneficial because it enables an initial fire extinguishing. However, the information obtained by the temperatures near the belt conveyor is not limited to the fire occurrence.

For example, if a roller of the belt conveyor cannot smoothly rotate due to failure, aging degradation or the like, a temperature of a rotating part increases by friction. For this reason, it is also possible to detect a roller abnormality by measuring the temperatures near the belt conveyor. Since the roller abnormality may increase a load of the belt conveyor and the increase in temperature due to the friction may cause a firing, it is preferably detect the roller abnormality at an early stage.

[Patent Document 1] Japanese Patent Application Publication No. 2014-83297A

However, the temperature increased due to the roller abnormality is very lower, as compared to the temperature upon the fire, and is also local. For this reason, the temperature may be hidden by noises or may not be sufficiently expressed in measured values due to a limit of a spatial resolution of the optical fiber temperature distribution measurement device.

A configuration of circulating an optical fiber in a coil shape in the vicinity of the roller so as to secure a length of the optical fiber disposed in the vicinity of the roller or detecting a slight change in temperature by bringing the optical fiber into close contact with a metal part configured to support the roller is considered. However, the above configuration should be provided for each roller. Therefore, a troublesome work for laying down the optical fiber is required, which increases the cost.

SUMMARY

Exemplary embodiments of the invention provide an optical fiber temperature distribution measurement system and an optical fiber temperature distribution measurement method capable of simply detecting a roller abnormality of a belt conveyor by a simple work for laying down an optical fiber.

An optical fiber temperature distribution measurement system according to a first aspect of the present invention is an optical fiber temperature distribution measurement system configured to enable a light pulse to be incident on an optical fiber and to measure a temperature distribution in a unit of a spatial resolution zone based on a return light from the optical fiber, the system comprising:

a temperature difference calculator configured to calculate temperature differences between corresponding spatial resolution zones based on a first temperature distribution and a second temperature distribution, the first temperature distribution being obtained by a return light from a first optical fiber part laid down along a roller row, the second temperature distribution being obtained by a return light from a second optical fiber part laid down side by side with the first optical fiber part at a position more distant from the roller row than the first optical fiber part; and an abnormality detector configured to calculate a temperature difference for evaluation for each spatial resolution zone, the temperature difference for evaluation being a sum of a temperature difference of each spatial resolution zone and a temperature difference of a spatial resolution zone adjacent thereto, and to determine that an abnormality has occurred in a roller near the spatial resolution zone when the calculated temperature difference for evaluation exceeds a reference value.

An optical fiber temperature distribution measurement system according to a second aspect of the present invention is an optical fiber temperature distribution measurement system configured to enable a light pulse to be incident on an optical fiber and to measure a temperature distribution in a unit of a spatial resolution zone based on a return light from the optical fiber, the system comprising:

a temperature difference calculator configured to calculate temperature differences between corresponding spatial resolution zones based on a first temperature distribution and a second temperature distribution, the first temperature distribution being obtained by a return light from an optical fiber part laid down along a roller row, the second temperature distribution being calculated from a temperature of a spatial resolution zone except for adjacent spatial resolution zones in the first temperature distribution; and an abnormality detector configured to calculate a temperature difference for evaluation for each spatial resolution zone, the temperature difference for evaluation being a sum of a temperature difference of each spatial resolution zone and a temperature difference of a spatial resolution zone adjacent thereto, and to determine that an abnormality has occurred in a roller included in the spatial resolution zone when the calculated temperature difference for evaluation exceeds a reference value.

An optical fiber temperature distribution measurement system according to third first aspect of the present invention is an optical fiber temperature distribution measurement system configured to enable a light pulse to be incident on an optical fiber and to measure a temperature distribution in a unit of a spatial resolution zone based on a return light from the optical fiber, the system comprising:

a data processor configured:

to calculate a temperature distribution of first temperatures, which is obtained by a return light from a first optical fiber part laid down along a roller row, and a temperature distribution of second temperatures, which is obtained by a return light from a second optical fiber part laid down side by side with the first optical fiber part at a position more distant from the roller row than the first optical fiber part, to calculate a temperature difference for evaluation for each spatial resolution zone, the temperature difference for evaluation being is a difference between a sum of the first temperature of each spatial resolution zone and the first temperatures of a spatial resolution zone adjacent thereto and a sum of the second temperature of each spatial resolution zone and the second temperatures of the spatial resolution zone adjacent thereto, and to determine that an abnormality has occurred in a roller near the spatial resolution zone when the calculated temperature difference for evaluation exceeds a reference value.

An optical fiber temperature distribution measurement system according to a fourth aspect of the present invention is an optical fiber temperature distribution measurement method of enabling a light pulse to be incident on an optical fiber and measuring a temperature distribution in a unit of a spatial resolution zone based on a return light from the optical fiber, the method comprising:

calculating temperature differences between corresponding spatial resolution zones based on a first temperature distribution and a second temperature distribution, the first temperature distribution being obtained by a return light from a first optical fiber part laid down along a roller row, the second temperature distribution being obtained by a return light from a second optical fiber part laid down side by side with the first optical fiber part at a position more distant from the roller row than the first optical fiber part;

calculating a temperature difference for evaluation for each spatial resolution zone, the temperature difference for evaluation is a difference between a sum of a first temperature of each spatial resolution zone and a first temperature of a spatial resolution zone adjacent thereto and a sum of a second temperature of each spatial resolution zone and a second temperature of the spatial resolution zone adjacent thereto, and determining that an abnormality has occurred in a roller near the spatial resolution zone when the calculated temperature difference for evaluation exceeds a reference value.

According to the invention, it is possible to provide the optical fiber temperature distribution measurement system and the optical fiber temperature distribution measurement method capable of simply detecting the roller abnormality of the belt conveyor by the simple work for laying down an optical fiber.

BRIEF DESCRIPTION OF THE DRAWINGS

FIG. 2 is a view explaining calculations of a temperature difference and a temperature difference for evaluation.

FIG. 6 is a view explaining calculation of a second temperature distribution.

DETAILED DESCRIPTION

Figure 1:
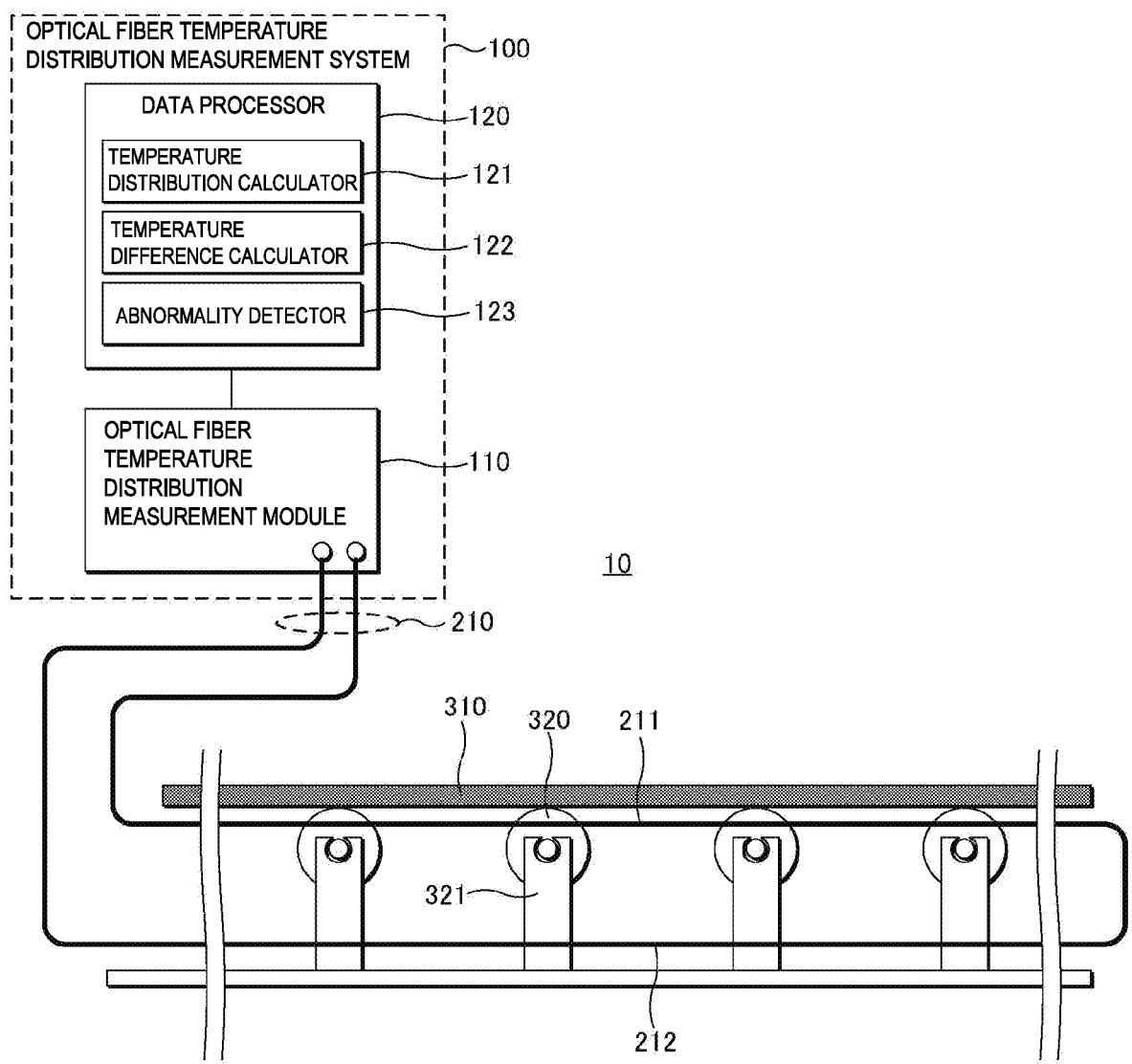
FIG. 1 is a block diagram depicting a configuration of a roller abnormality detection system of a belt conveyor configured using an optical fiber temperature distribution measurement system according to an exemplary embodiment of the invention.

An exemplary embodiment of the invention will be described with reference to the drawings. FIG. 1 is a block diagram depicting a configuration of a roller abnormality detection system 10 of a belt conveyor configured using an optical fiber temperature distribution measurement system 100 according to an exemplary embodiment of the invention.

As shown in FIG. 1, the optical fiber temperature distribution measurement system 100 configured to detect an abnormality of a roller 320 of a belt conveyor 310 has an optical fiber temperature distribution measurement module 110 and a data processor 120. The optical fiber temperature distribution measurement system 100 is particularly favorable to the abnormality detection of the roller 320 of the belt conveyor 310. However, it can also be applied to the abnormality detection of a roller row for another utility.

Herein, a plurality of the rollers 320 is held at metallic roller support posts 321 and provided at an interval of 1 m, for example, in a conveying direction of the belt conveyor 310, thereby forming a roller row. A temperature of the roller 320 of which rotation is abnormal increases due to friction at a contact part with a bearing part or the belt conveyor 310.

The optical fiber temperature distribution measurement module 110 may be configured using an optical fiber temperature distribution measurement device (DTS: Distributed Temperature Sensor), for example. In the optical fiber temperature distribution measurement module 110, a spatial resolution, which is a unit about a length of temperature detection, is defined as the specification. The spatial resolution is usually about 1 m and may change depending on a length of light path.

The data processor 120 has a temperature distribution calculator 121, a temperature difference calculator 122 and an abnormality detector 123, and may be configured using an information processing apparatus such as a PC in which application software developed as a tool for an optical fiber temperature distribution measurement device has been installed.

The optical fiber temperature distribution measurement system 100 is configured to measure a temperature distribution by using Raman scattered light, which is highly dependent on temperatures, of backscattered light that is to be generated when a pulse light is incident on the optical fiber. The Raman scattered light includes anti-Stokes light, which is to be generated at a short wavelength-side of a wavelength of a light pulse, and Stokes light, which is to be generated at a long wavelength-side, and an intensity ratio thereof changes in proportional to a change in temperature.

In the optical fiber temperature distribution measurement system 100, the optical fiber temperature distribution measurement module 110 and the temperature distribution calculator 121 of the data processor 120 are configured to perform the same operations as the related art.

That is, the optical fiber temperature distribution measurement module 110 is configured to enable the pulse light to be repeatedly incident on the optical fiber laid down along a measurement target, and to measure temporal changes of the intensities of the Stokes light and the anti-stokes light with respect to the pulse light. The temporal changes of the intensities of the stokes light and the anti-stokes light correspond to a backscattered light generation position on an optical fiber path. Therefore, the temperature distribution calculator 121 is configured to calculate a temperature distribution of the measurement target, based on a measurement result of the optical fiber temperature distribution measurement module 110.

In the exemplary embodiment, the optical fiber 210 is laid down along the roller row, which is the measurement target. However, as shown in FIG. 1, the optical fiber is laid down into a loop shape so that a first optical fiber part 211 close to the roller row and a second optical fiber part 212 more distant from the roller row than the first optical fiber part 211 are formed. The first optical fiber part 211 has a function of measuring temperatures of the rollers 320 and the second optical fiber part 212 has a function of measuring environment temperatures near the rollers 320. The first optical fiber part 211 and the second optical fiber part 212 are straightly laid down to be parallel with the roller row so that distances from the respective rollers 320 are not unequal.

The optical fiber 210 is arbitrarily laid down so that the first optical fiber part 211 is disposed in the vicinity of the metallic roller support posts 321 at which the first optical fiber part 211 can detect an increase in temperature of the rollers 320 and a distance (for example, 20 to 30 cm) within which the second optical fiber part 212 is not influenced by the increase in temperature of the rollers 320 can be secured. That is, it is not necessary to circulate the optical fiber 210 into a coil shape or to bring the optical fiber into close contact with the metallic roller support posts 321. For this reason, it is possible to simply lay down the optical fiber 210, so that it is possible to suppress a troublesome work for laying down an optical fiber or the cost increase.

The temperature difference calculator 122 of the data processor 120 is configured to calculate a temperature difference between corresponding spatial resolution zones, based on a first temperature distribution, which is to be obtained by a return light from the first optical fiber part 211, and a second temperature distribution, which is to be obtained by a return light from the second optical fiber part 212.

Herein, the spatial resolution zone is a temperature measurement zone delimited by the spatial resolution. That is, a measured temperature is obtained for each spatial resolution zone. Also, the corresponding spatial resolution zones mean spatial resolution zones that can be regarded as the same position in the roller row direction of the first optical fiber part 211 and second optical fiber part 212 laid down side by side. Since positions of both ends of the roller row can be easily specified in the temperature distribution of the measurement result, the corresponding spatial resolution zones can also be easily specified.

The temperature difference is a value indicating how higher the measured temperature of the first optical fiber part 211 is with respect to the measured temperature of the second optical fiber part 212 in the corresponding spatial resolution zones. In the corresponding spatial resolution zones, it is assumed that effects of surrounding environments such as sunlight and wind are substantially the same. For this reason, it is thought that the temperature difference is caused due to radiation heat resulting from the increase in temperature of the roller 320, and the effects of diverse disturbances can be excluded.

However, the increase in temperature of the roller 320 due to the abnormality is local and is averaged in the spatial resolution zone. For this reason, a value indicated as the temperature difference is small and is thus difficult to be detected. Also, when an abnormality occurs in the roller 320 of which an installation location is across the spatial resolution zones, an increase in temperature is dispersed in the two spatial resolution zones. Therefore, the temperature difference is further reduced and is thus difficult to be detected.

Therefore, as shown in FIG. 2, the abnormality detector 123 is configured to calculate a temperature difference for evaluation for each spatial resolution zone. The temperature difference for evaluation is a sum of a temperature difference of each spatial resolution zone and temperature differences of the spatial resolution zones contiguous in the roller row direction before and after each spatial resolution zone. When the calculated temperature difference for evaluation exceeds a reference value, it is determined that an abnormality has occurred in the roller near the spatial resolution zone.

Figure 3A:
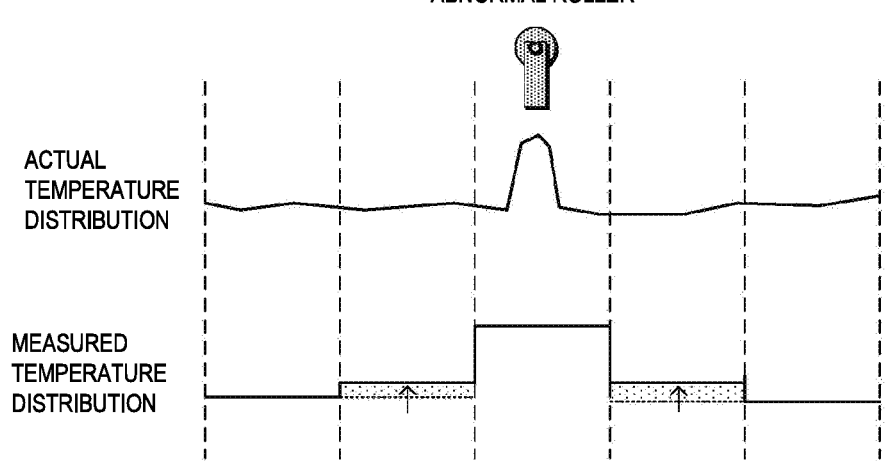
FIGS. 3A and 3B are views explaining adding of spatial resolution zones adjacent to each other.

The above configuration is based on a fact that even when a temperature increases in a specific spatial resolution zone, a part of the increase in temperature also appears as an increase in temperature of the adjacent spatial resolution zone because of the definition of the spatial resolution, as shown in FIG. 3A. The increase in temperature appearing in the adjacent spatial resolution zone is small. However, when it is summed, the increase in temperature of the spatial resolution zone in which the temperature has actually increased is emphasized. Thereby, it is possible to precisely detect the local and small increase in temperature, which is caused due to the abnormal roller 320.

Figure 3B:
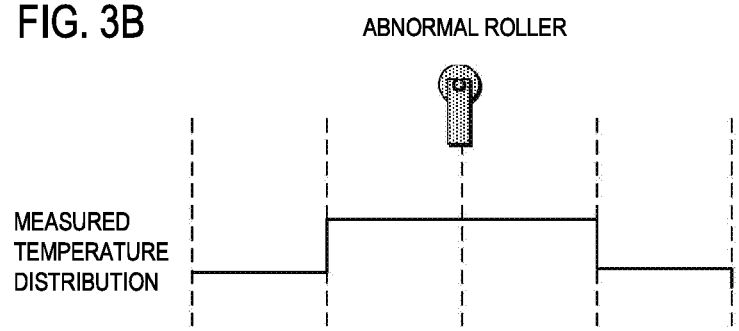

Also, by the sum of the temperature differences of the adjacent spatial resolution zones, as shown in FIG. 3B, even when the abnormal roller 320 is across the two spatial resolution zones and the increase in temperature is dispersed in each of the spatial resolution zones, it is possible to perform the evaluation by the summed increase in temperature.

Figure 4:
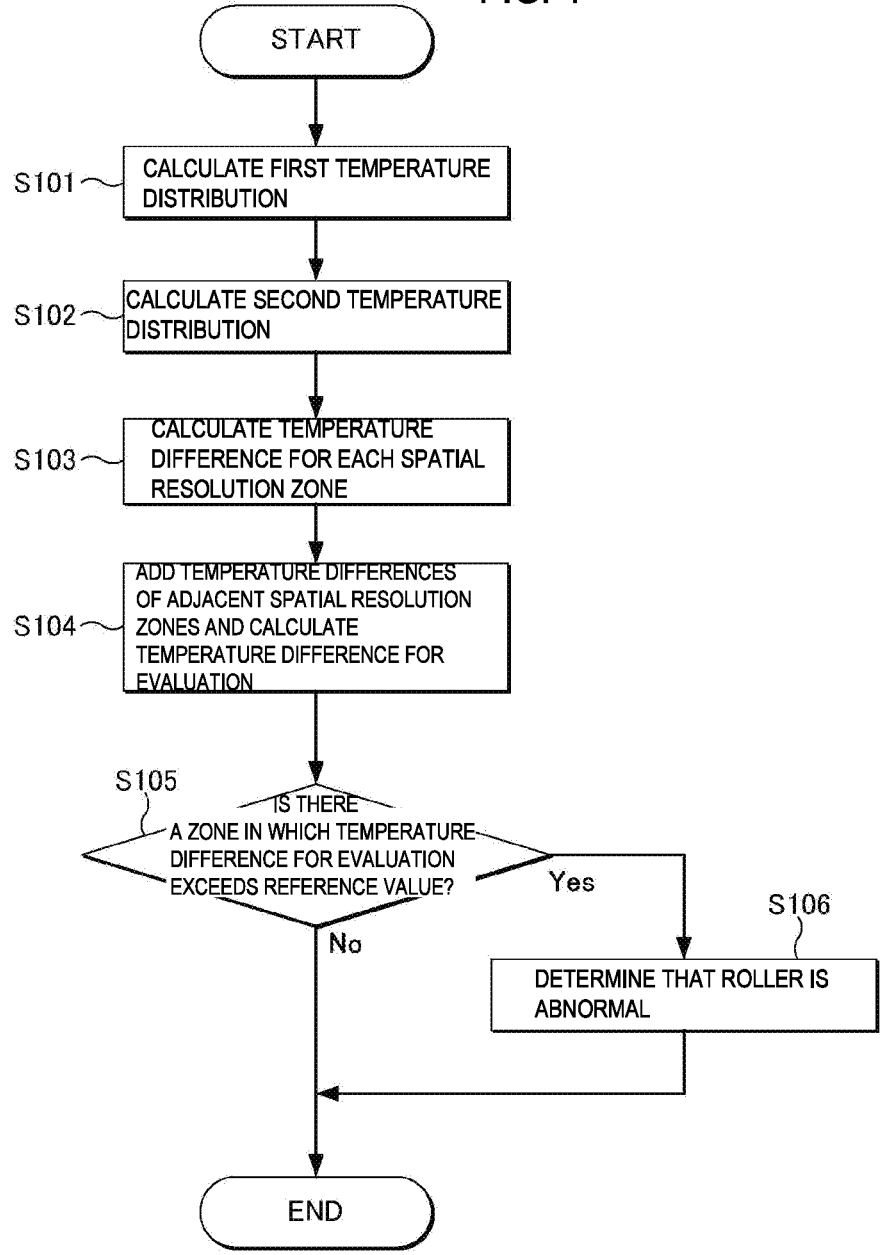
FIG. 4 is a flowchart depicting operations of the optical fiber temperature distribution measurement system.

Subsequently, operations of the optical fiber temperature distribution measurement system 100 of the exemplary embodiment are described with reference to a flowchart of FIG. 4.

First, the temperature distribution calculator 121 calculates a first temperature distribution based on the return light of the first optical fiber part 211 (S101) and also calculates a second temperature distribution based on the return light of the second optical fiber part 212 (S102).

Then, the temperature difference calculator 122 calculates a temperature difference between the corresponding spatial resolution zones based on the first temperature distribution and the second temperature distribution (S103).

After the temperature difference is calculated, the abnormality detector 123 calculates a temperature difference for evaluation, which is a sum of a temperature difference of each spatial resolution zone and temperature differences of the adjacent spatial resolution zones, for each spatial resolution zone (S104).

Then, it is determined whether there is a spatial resolution zone in which the calculated temperature difference for evaluation exceeds a predetermined reference value (S105). When it is determined that there is the spatial resolution zone in which the calculated temperature difference for evaluation exceeds the predetermined reference value, it is determined that an abnormality has occurred in the roller 320 near the spatial resolution zone (S106).

By the above operations, the optical fiber temperature distribution measurement system 100 can detect the abnormality of the roller 320.

In the above embodiment, the first optical fiber part 211 and the second optical fiber part 212 are configured by forming one optical fiber 210 into a loop shape. Thereby, measurement timings of the first temperature distribution and the second temperature distribution are the same, the effect of removing the disturbance is increased and the noise resistance is improved by the bidirectional measurement. However, the first optical fiber part 211 and the second optical fiber part 212 may also be configured by two independent optical fibers.

Also, in the above embodiment, the temperature difference is calculated for each spatial resolution zone and is summed with the temperature differences of the adjacent spatial resolution zones, so that the temperature difference for evaluation is calculated. However, the temperature difference for evaluation may also be calculated by adding the measured temperatures of the adjacent spatial resolution zones and then calculating the temperature difference for each spatial resolution zone.

Figure 5:
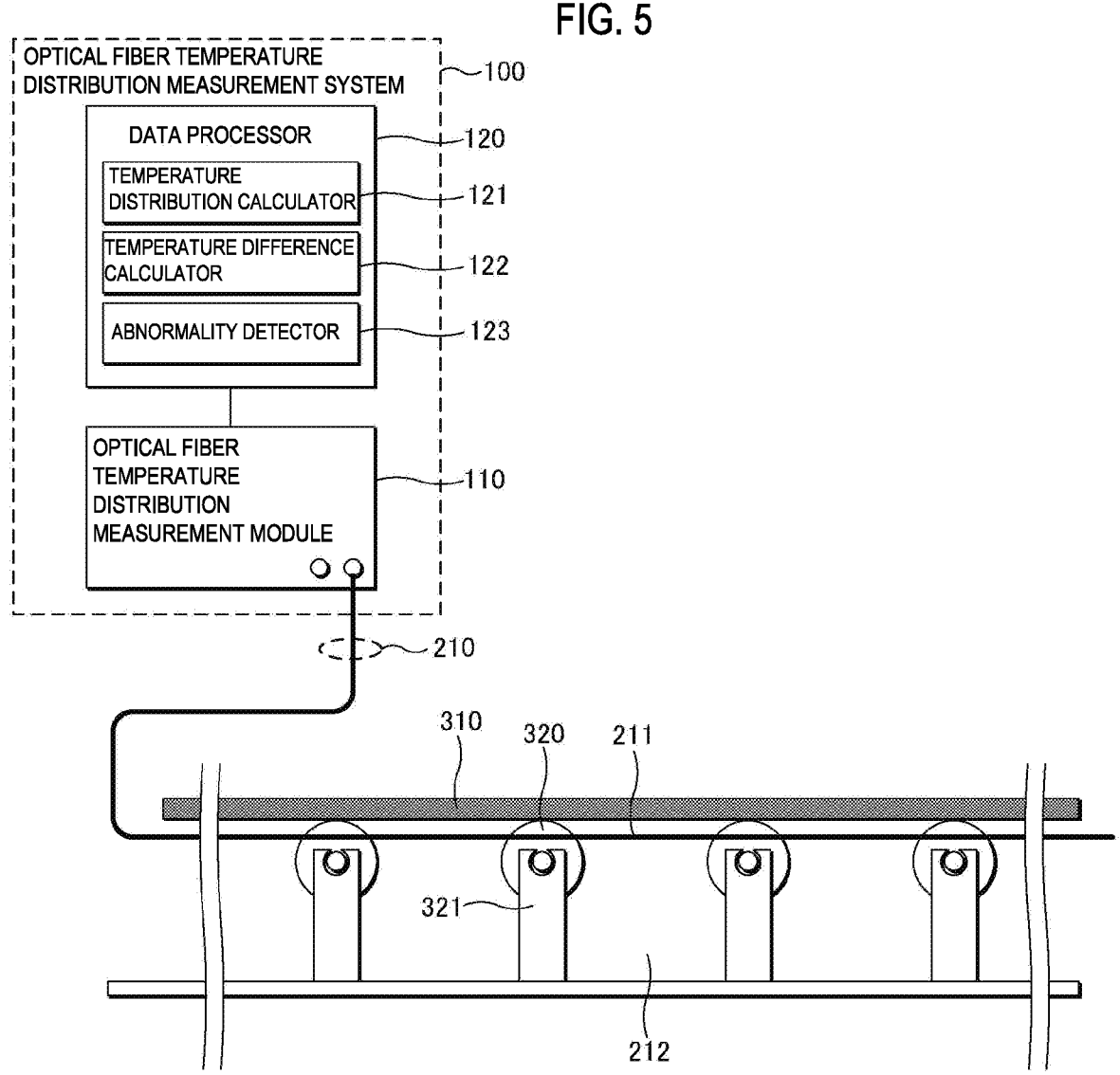
FIG. 5 is a block diagram depicting another configuration of the roller abnormality detection system.

Also, when the surrounding environment temperature is stable, the optical fiber 210 may be configured only by the first optical fiber part 211 with the second optical fiber part 212 being omitted, as shown in FIG. 5. Thereby, it is possible to further simplify the work for laying down an optical fiber and to save the cost.

In the above modified configuration, the second temperature distribution for each spatial resolution zone is estimated using the first temperature distribution of the spatial resolution zone except for the adjacent spatial resolution zones. For example, as shown in FIG. 6, the second temperature distribution can be estimated from an average value of the measured temperatures of the front and rear spatial resolution zones distant by two zones. Also, the second temperature distribution can be estimated using temperatures of the other spatial resolution zones inasmuch as they are spatial resolution zones except for the adjacent spatial resolution zones. For example, the second temperature distribution may be estimated using one of the front and rear spatial resolution zones or from an average value of the more spatial resolution zones.

What is claimed is:

1. An optical fiber temperature distribution measurement system configured to enable a light pulse to be incident on an optical fiber and to measure a temperature distribution in units of a spatial resolution zone based on a return light from the optical fiber, the system comprising:
    a temperature distribution calculator configured to calculate a first temperature distribution being obtained by a return light from a first optical fiber part laid down along a row of rollers, the first temperature distribution comprising a plurality of spatial resolution zones, each spatial resolution zone defined by a spatial resolution, and a second temperature distribution being obtained by a return light from a second optical fiber part laid down side by side with the first optical fiber part at a position more distant from the row than the first optical fiber part, the second temperature distribution comprising a plurality of spatial resolution zones also defined by the spatial resolution and corresponding respectively to the spatial resolution zones of the first temperature distribution;
    a temperature difference calculator configured to calculate, for each spatial resolution zone, a temperature difference between a first temperature in the spatial resolution zone from the first temperature distribution and a second temperature in the corresponding spatial resolution zone from the second temperature distribution; and
    an abnormality detector configured to calculate, for each spatial resolution zone, a sum of the calculated temperature difference of the spatial resolution zone and the calculated temperature differences of spatial resolution zones adjacent thereto, and to determine that an abnormality has occurred in a roller monitored by a spatial resolution zone when the calculated sum for the spatial resolution zone exceeds a reference value.

2. The optical fiber temperature distribution measurement system according to claim 1, wherein the row of rollers are spaced along a belt conveyor.

3. The optical fiber temperature distribution measurement system according to claim 1, wherein the first optical fiber part and the second optical fiber part are parts of one optical fiber and have a loop shape.

4. The system according to claim 1, wherein the spatial resolution is about 1 meter.

5. An optical fiber temperature distribution measurement system configured to enable a light pulse to be incident on an optical fiber and to measure a temperature distribution in units of a spatial resolution zone based on a return light from the optical fiber, the system comprising:
    a temperature distribution calculator configured to calculate a first temperature distribution being obtained by a return light from a first optical fiber part laid down along a row of rollers, the first temperature distribution comprising a plurality of spatial resolution zones, each spatial resolution zone defined by a spatial resolution, and a second temperature distribution being estimated from the first temperature distribution, the second temperature distribution comprising a plurality of spatial resolution zones also defined by the spatial resolution and corresponding respectively to the spatial resolution zones of the first temperature distribution;
    a temperature difference calculator configured to calculate, for each spatial resolution zone, a temperature difference between a first temperature in the spatial resolution zone from the first temperature distribution and a second temperature in the corresponding spatial resolution zone from the second temperature distribution; and
    an abnormality detector configured to calculate for each spatial resolution zone, a sum of the calculated temperature difference of the spatial resolution zone and the calculated temperature differences of the spatial resolution zones adjacent thereto, and to determine that an abnormality has occurred in a roller included in the spatial resolution zone when the sum for the spatial resolution zone exceeds a reference value.

6. The optical fiber temperature distribution measurement system according to claim 5, wherein the row of rollers are spaced along a belt conveyor.

7. The system according to claim 5, wherein, for each spatial resolution zone, the second temperature distribution for the spatial resolution zone is estimated from spatial resolution zones of the first temperature distribution other than the spatial resolution zone of the first temperature distribution and spatial resolution zones immediately adjacent to the spatial resolution zone of the first temperature distribution.

8. An optical fiber temperature distribution measurement system configured to enable a light pulse to be incident on an optical fiber and to measure a temperature distribution in units of a spatial resolution zone based on a return light from the optical fiber, the system comprising:
    a data processor configured to:
        calculate a temperature distribution of first temperatures obtained by a return light from a first optical fiber part laid down along a row of rollers, the temperature distribution of first temperatures comprising a plurality of spatial resolution zones, each spatial resolution zone defined by a spatial resolution, calculate a temperature distribution of second temperatures obtained by a return light from a second optical fiber part laid down side by side with the first optical fiber part at a position more distant from the row than the first optical fiber part, the temperature distribution of second temperatures comprising a plurality of spatial resolution zones also defined by the spatial resolution and corresponding respectively to the spatial resolution zones of the temperature distribution of first temperatures, calculate, for each spatial resolution zone, a temperature difference between a first sum of the first temperatures of the spatial resolution zone and the first temperatures of spatial resolution zones adjacent thereto and a second sum of the second temperatures of the spatial resolution zone and the second temperatures of the spatial resolution zones adjacent thereto, and determine that an abnormality has occurred in a roller monitored by the spatial resolution zone when the calculated temperature difference for the spatial resolution zone exceeds a reference value.

9. The optical fiber temperature distribution measurement system according to claim 8, wherein the row of rollers are spaced along a belt conveyor.

10. The optical fiber temperature distribution measurement system according to claim 8, wherein the first optical fiber part and the second optical fiber part are parts of one optical fiber and have a loop shape.

11. An optical fiber temperature distribution measurement method of enabling a light pulse to be incident on an optical fiber and measuring a temperature distribution in units of a spatial resolution zone based on a return light from the optical fiber, the method comprising:

obtaining a first temperature distribution from a return light from a first optical fiber part laid down along a row of rollers, the first temperature distribution comprising a plurality of spatial resolution zones, each spatial resolution zone defined by a spatial resolution;

obtaining a second temperature distribution from a return light from a second optical fiber part laid down side by side with the first optical fiber part at a position more distant from the row than the first optical fiber part, the second temperature distribution comprising a plurality of spatial resolution zones also defined by the spatial resolution and corresponding respectively to the spatial resolution zones of the first temperature distribution;

calculating, for each spatial resolution zone, a temperature difference between a first temperature in the spatial resolution zone from the first temperature distribution and a second temperature in the corresponding spatial resolution zone from the second temperature distribution;

calculating, for each spatial resolution zone, a sum of the calculated temperature difference of the spatial resolution zone and the calculated temperature differences of spatial resolution zones adjacent thereto, and determining that an abnormality has occurred in a roller monitored by a spatial resolution zone when the calculated sum for the spatial resolution zone exceeds a reference value.

* * * * *